(12) United States Patent  (10) Patent No.: US 10,896,559 B2
Werner et al.  (45) Date of Patent: Jan. 19, 2021

(54) ELECTRONIC DEVICE CONTAINMENT SYSTEM WITH CONTAINED DEVICE OPERATION CAPABILITY

(71) Applicant: INTERNATIONAL BUSINESS MACHINES CORPORATION, Armonk, NY (US)

(72) Inventors: John S. Werner, Fishkill, NY (US); Noah Singer, New City, NY (US); Budy D. Notohardjono, Poughkeepsie, NY (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/032,250

(22) Filed: Jul. 11, 2018

(65) Prior Publication Data

US 2020/0020183 A1  Jan. 16, 2020

(51) Int. Cl.
*G08B 17/12* (2006.01)
*G07C 9/00* (2020.01)
(Continued)

(52) U.S. Cl.
CPC ....... *G07C 9/00182* (2013.01); *G06F 1/1626* (2013.01); *G06F 1/1632* (2013.01);
(Continued)

(58) Field of Classification Search
CPC ........ G07C 9/00182; G07C 2009/0019; G06F 1/1626; G06F 1/1632; G06F 1/1643; G06F 3/0484; G06F 3/0488
See application file for complete search history.

(56) References Cited

U.S. PATENT DOCUMENTS

| 4,236,463 A | * | 12/1980 | Westcott | ............... | A45C 13/24 |
| | | | | | 109/33 |
| 4,616,694 A | * | 10/1986 | Hsieh | ................... | A62B 13/00 |
| | | | | | 165/47 |

(Continued)

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Hai Phan
*Assistant Examiner* — Son M Tang
(74) *Attorney, Agent, or Firm* — Teddi Maranzano, Esq.; Kevin P. Radigan, Esq.; Heslin Rothenberg Farley & Mesiti P.C.

(57) ABSTRACT

Electronic device containment is provided by a containment structure with an internal compartment sized to receive an electronic device. The containment structure includes an incident containment mechanism to facilitate containing a failure incident of the electronic device within the containment structure when the electronic device is positioned within the containment structure. An electronic system is associated with the containment structure and the electronic device operatively couples to the electronic system to allow a user to operate the electronic device remotely via the electronic system when positioned within the containment structure.

10 Claims, 11 Drawing Sheets

(51) Int. Cl.
 *G06F 1/16* (2006.01)
 *G06F 3/0488* (2013.01)
 *G06F 3/0484* (2013.01)

(52) U.S. Cl.
 CPC .......... *G06F 1/1643* (2013.01); *G06F 3/0484* (2013.01); *G06F 3/0488* (2013.01); *G07C 2009/0019* (2013.01)

(56) References Cited

U.S. PATENT DOCUMENTS

| | | | | |
|---|---|---|---|---|
| 5,056,603 | A * | 10/1991 | Parkinson | A62C 3/00 169/26 |
| 6,252,602 | B1 * | 6/2001 | Matsuda | G06F 3/04815 345/473 |
| 6,646,864 | B2 * | 11/2003 | Richardson | G06F 1/1626 206/305 |
| 7,132,925 | B2 * | 11/2006 | Johnson | A47G 29/141 340/5.73 |
| 7,180,735 | B2 * | 2/2007 | Thomas | G06F 1/1626 206/701 |
| 7,230,823 | B2 * | 6/2007 | Richardson | G06F 1/1626 220/23.91 |
| 7,232,197 | B2 * | 6/2007 | Davis | E05G 1/024 312/409 |
| 7,609,512 | B2 * | 10/2009 | Richardson | G06F 1/1626 361/679.41 |
| 7,843,689 | B2 * | 11/2010 | Moore | G06F 1/20 109/41 |
| 7,907,394 | B2 * | 3/2011 | Richardson | G06F 1/1613 312/223.1 |
| 8,544,670 | B2 * | 10/2013 | Brilmyer | G11B 33/1406 109/33 |
| 8,928,623 | B2 | 1/2015 | Abbate et al. | |
| 9,180,324 | B2 * | 11/2015 | Burkett | A62C 2/06 |
| 9,339,671 | B1 | 5/2016 | Raj et al. | |
| 9,578,942 | B2 * | 2/2017 | Brilmyer | A45C 11/00 |
| 9,586,067 | B1 | 3/2017 | Kirkbride | |
| 9,643,036 | B2 | 5/2017 | Burkett | |
| 9,697,663 | B2 * | 7/2017 | Johnson | A47G 29/141 |
| 9,719,797 | B2 | 8/2017 | Fino et al. | |
| 2003/0080124 | A1 * | 5/2003 | Parker | A45C 13/008 220/4.21 |
| 2004/0262018 | A1 * | 12/2004 | Roussin | A62C 8/06 169/50 |
| 2006/0197750 | A1 * | 9/2006 | Kerr | G06F 1/1626 345/173 |
| 2006/0279924 | A1 * | 12/2006 | Richardson | G06F 1/1613 361/679.09 |
| 2006/0284847 | A1 * | 12/2006 | Pate | G06F 3/0238 345/168 |
| 2007/0061598 | A1 * | 3/2007 | Bitton | G06F 21/70 713/194 |
| 2008/0290094 | A1 * | 11/2008 | Bruce | A45C 3/001 220/560.01 |
| 2009/0009945 | A1 * | 1/2009 | Johnson | G06F 1/1613 361/679.27 |
| 2009/0014188 | A1 | 1/2009 | Hesch et al. | |
| 2011/0073608 | A1 * | 3/2011 | Richardson | A45C 11/00 220/737 |
| 2012/0176396 | A1 * | 7/2012 | Harper | G06F 3/1431 345/589 |
| 2013/0221050 | A1 * | 8/2013 | Murphy | A45C 5/06 224/607 |
| 2013/0222434 | A1 * | 8/2013 | Park | G06T 3/4092 345/668 |
| 2013/0299498 | A1 * | 11/2013 | Magness | G06F 1/1656 220/315 |
| 2013/0328878 | A1 * | 12/2013 | Stahl | G06F 3/1431 345/428 |
| 2014/0003024 | A1 * | 1/2014 | Reitmann | G06F 17/00 361/818 |
| 2015/0060092 | A1 * | 3/2015 | Kho | A62C 35/58 169/44 |
| 2016/0084454 | A1 * | 3/2016 | Svitak, Sr. | H02S 20/00 362/183 |
| 2016/0175189 | A1 * | 6/2016 | Fils | G06F 1/1632 700/94 |
| 2017/0361139 | A1 | 12/2017 | Koreis et al. | |
| 2018/0046229 | A1 | 2/2018 | Balourdet | |
| 2018/0176724 | A1 * | 6/2018 | Smith | H04W 4/021 |

OTHER PUBLICATIONS

International Business Machines Corporation (IBM), "z/Architecture Principles of Operation," IBM® Publication No. SA22-7832-10, Eleventh Edition, Mar. 2015, (pp. 1-1732).
International Business Machines Corporation (IBM), "Power ISA™ Version 2.07B," Apr. 9, 2015, (pp. 1-1527).
Orion Case, "XCPro3—Case Only (Class 1, Div 2 & Zone2)," http://www.orioncase.com/product/xpro3, [Retrieved from the Internet on Jul. 12, 2018], (2 pages).
CellBlockFCS, "LIBIK—Lithium-Ion Battery Incident Kit," https://www.cellblockfcs.com, [Retrieved from the Internet on Jul. 2, 2018], (3 pages).
PlaneGard, "Protect People and Property with PlaneGard," http://www.planegard.com, [Retrieved from the Internet on Jul. 2, 2018], (4 pages).

\* cited by examiner ions move from a negative electrode to a positive electrode during discharge and back when charging. An intercalated lithium compound is used in a lithium-ion battery as one electrode material. The electrolyte, which allows for ionic movement, and the two electrodes are constituent components of a lithium-ion battery cell. A cell is a basic electrochemical unit that contains the electrodes, separator and electrolyte. A battery or battery pack is a collection of cells or cell assemblies. These may be ready for use in an electronic device by providing an appropriate housing, and electrical interconnections.

Recent events have highlighted the potential for thermal runaway events with the application of lithium-ion technology-based batteries. These events have typically been associated with two different types of causes, namely, an internal short circuit associated with a manufacturing or design defect, or a catastrophic failure due to an external event, such as an external heating event (e.g., fire). In either case, the failure incident can be dangerous to anyone or anything nearby at the time of the event.

ELECTRONIC DEVICE CONTAINMENT SYSTEM WITH CONTAINED DEVICE OPERATION CAPABILITY

BACKGROUND

There are a wide variety of rechargeable batteries available today for use as energy sources, including for powering electronic devices, such as portable electronic devices. Lithium-ion batteries are one type of rechargeable battery in which lithium

SUMMARY

Certain shortcomings of the prior art are overcome and additional advantages are provided through the provision of an electronic device containment system which includes a containment structure and an electronic system associated with the containment structure. The containment structure has an internal compartment sized to receive an electronic device, and includes an incident containment mechanism to facilitate containing a failure incident of the electronic device within the containment structure when the electronic device is positioned within the containment structure. The electronic device operatively couples to the electronic system to allow a user to operate the electronic device remotely via the electronic system when disposed within the containment structure.

In another aspect, a method of securing an electronic device for transport is provided. The method includes obtaining an electronic device containment system which includes a containment structure and an electronic system. The containment structure has an internal compartment sized to receive the electronic device, and includes an incident containment mechanism. The electronic system is associated with the containment structure, and the electronic device operatively connects to the electronic system to allow a user to operate the electronic device remotely via the electronic system when disposed within the containment structure. The method further includes: placing the electronic device within the internal compartment of the containment structure and operatively connecting the electronic device to the electronic system to allow remote operation of the electronic device via the electronic system; and locking the electronic device within the internal compartment of the containment structure, where the incident containment mechanism facilitates containing a failure incident of the electronic device within the containment structure.

In a further aspect, a method is provided which includes fabricating an electronic device containment system. Fabricating the electronic device containment system includes providing a containment structure with an internal compartment sized to receive an electronic device. The containment structure includes an incident containment mechanism to facilitate containing a failure event of the electronic device when the electronic device is positioned within the containment structure. Further, fabricating the electronic containment system includes associating an electronic system with the containment structure. The electronic device operatively couples to the electronic system to allow a user to operate the electronic device remotely via the electronic system when positioned within the containment structure.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
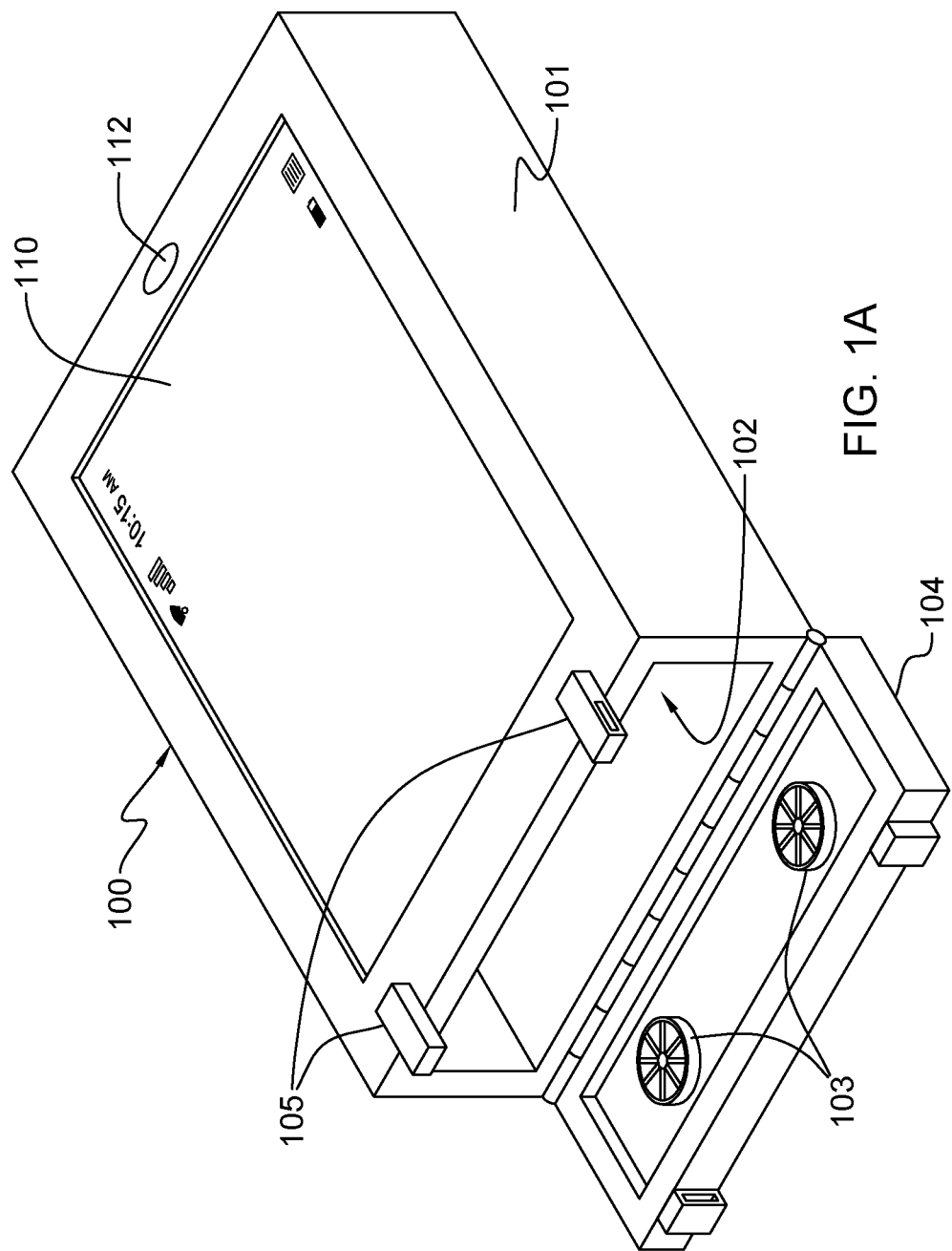
FIG. 1A depicts one embodiment of an electronic device containment system, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of an electronic device containment system, and/or methods of fabrication or use thereof, in accordance with one or more aspects of the present invention.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. Aspects of an electronic system embodiment such as discussed herein can be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

As noted, lithium-ion batteries are used today in many portable electronic devices, including smartphones, tablets, laptops, portable computers, cameras, personal digital assistants, gaming devices, etc., due to certain inherent advantages over other rechargeable battery technologies, including, for instance, a higher power density, a lower weight, a lower self-discharge, and little or no "memory" effect. Although rare, lithium-ion batteries have been known to be subject to a failure event, and can be a fire hazard, with the potential to even explode, and therefore can possess a safety concern to anyone nearby. The chemistry of the cell, high energy density, and a flammable electrolyte, are factors that contribute to the potential for explosion, which although rare, remains a concern.

In view of the increasing use of lithium-ion batteries, as well as the potential for danger that could be caused when used on a transport, the U.S. Government is considering implementing a ban on laptop computers and other portable electronic devices from cabins of commercial flights where the devices contain lithium-ion batteries. Today, in the event of a battery-related incident on a commercial flight, a plane may have to go through an expensive emergency turnaround and/or landing process.

As one possible solution, a containment structure can be provided for electronic devices containing potentially hazardous power sources, such as lithium-ion batteries. However, securing an electronic device within a containment structure, for instance, to allow transport of the device, would not allow a user to access or use the device inside of the container when traveling. Further, there would be no capability to monitor the electronic device within such a containment structure, and as such, a user or other person would have no knowledge as to whether the electronic device is likely to experience an incident, and any suppression mechanism associated with the containment structure only becomes operational once a failure incident of the electronic device occurs.

Another transport approach is an electronic device containment system such as disclosed herein, where a user can remotely operate the electronic device via an electronic system associated with the containment structure when the electronic device is secured within the containment structure. Note that the term "transport" is used herein broadly to mean any type of transport approach including, for instance, travel by airplane, ship, ferry, train, subway, bus, or other motor or electric vehicle modes of transport. Note also that although described herein in connection with transport of a user and/or an electronic device possessed by the user, the electronic device containment systems disclosed could be utilized in a variety of settings where nonusers could potentially be affected by a failure incident of the electronic device. For instance, the containment systems could be employed within non-transport environments such as an office building, arena, or any other location where a lithium-ion incident (or other battery incident) could introduce risk to others.

Generally stated, disclosed herein are electronic device containment systems, as well as methods of fabrication and use. The electronic device containment system includes, for instance, a containment structure with an internal compartment, sized to receive one or more electronic devices, and one or more incident containment mechanisms to facilitate containing a failure incident of the electronic device within the containment structure when the electronic device is positioned within the containment structure. An electronic system is associated with the containment structure, and the electronic device operatively couples to the electronic system to allow a user to operate the electronic device remotely via the electronic system when disposed within the containment structure.

In one or more embodiments, the electronic system includes an interface to the electronic device. The interface facilitates user interaction with the electronic device when operatively coupled to the electronic system. In one or more embodiments, at least one of the electronic system and the electronic device translates user input via the interface of the electronic system to a corresponding input to the electronic device when the electronic device is operatively coupled to the electronic system. For instance, in one or more embodiments, the interface of the electronic system can include an external display associated with the containment structure.

Further, in one or more implementations, at least one of the electronic system and the electronic device can facilitate translating user input, including a user indicated XY interaction location with the external display, to a corresponding input to the portable electronic device when the electronic device is operatively coupled to the electronic system. Further, where the external display is a touch-screen display, the electronic system and/or the electronic device can facilitate translating user applied input pressure to the external display to a corresponding input to the electronic device.

In one or more embodiments, an electronic lock is associated with the containment structure. The electronic lock locks the electronic device within the containment structure, and can be controlled by the electronic system, based on one or more of a location of the electronic device containment system, an altitude of the electronic device containment system, a proximity of the containment system to a lock controller associated with a transport upon which the electronic device system is to be used, or a connection of the electronic device to a transport network associated with a transport upon which the electronic device containment system is used. For instance, the electronic system can automatically lock the electronic lock when altitude of the electronic device containment system exceeds a set threshold altitude. In one or more additional embodiments, the electronic system can automatically lock the electronic lock based on the electronic device being operatively disposed within the containment structure and connected, via the electronic system, to a transport network (such as a Wi-Fi network) of a transport upon which the electronic device containment system is used.

Figure 1B:
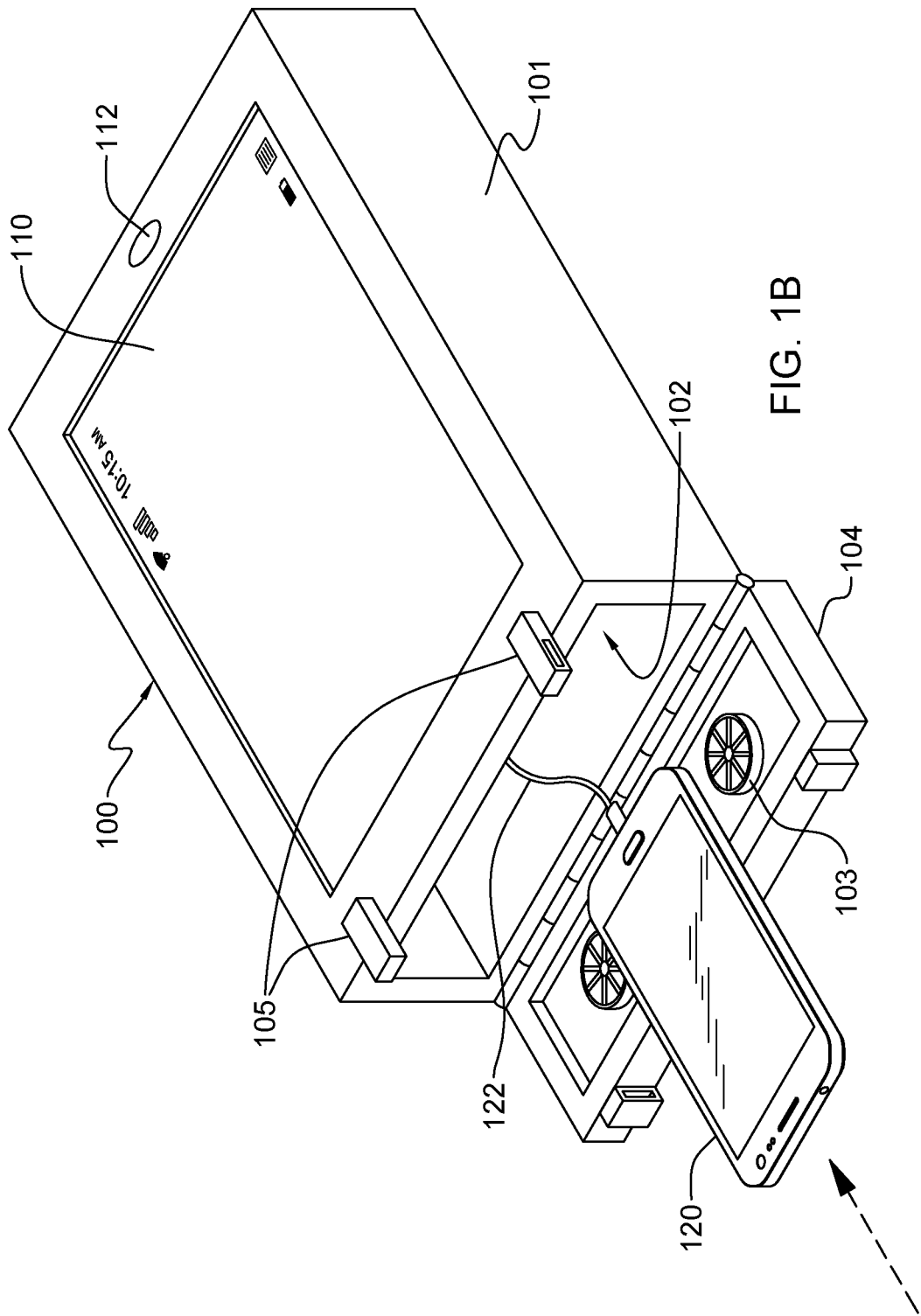
FIG. 1B depicts the electronic device containment system of FIG. 1A with an electronic device shown operatively connected to, and being inserted into, the containment system, in accordance with one or more aspects of the present invention.
Figure 1C:
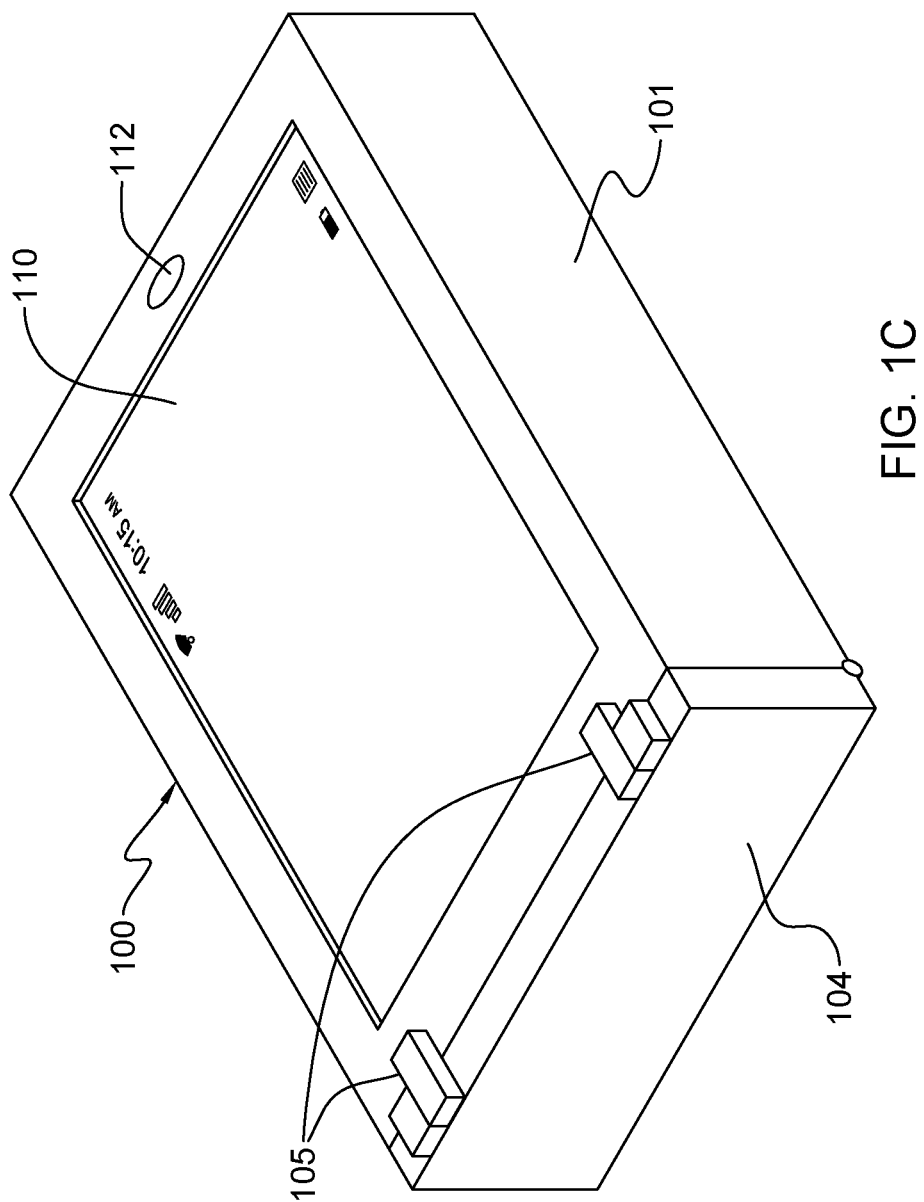
FIG. 1C depicts the electronic device containment system of FIGS. 1A & 1B, with the portable electronic device of FIG. 1B operatively secured within the containment structure, in accordance with one or more aspects of the present invention.

By way of example, FIGS. 1A-1C depict one embodiment of an electronic device containment system 100, in accordance with one or more aspects of the present invention. In the embodiment shown, electronic device containment system 100 includes a containment structure 101 with an internal compartment 102 sized to receive one or more electronic devices 120 (FIG. 1B). Containment structure 101 is designed, configured, constructed, etc., to facilitate containing a failure incident of electronic device(s) 120 when secured within the containment structure. Those skilled in the art will recognize that to facilitate accomplishing incident containment, containment structure 101 includes one or more incident containment mechanisms 103 within or associated with internal compartment 102. A hinged cover or door 104 provides access to internal compartment 102, and is configured to seal the internal compartment once electronic device(s) 120 is positioned, within the compartment. A lock mechanism, such as one or more electronic locks 105, is also provided to securely lock (in one or more embodiments) the electronic device(s) 120 within internal compartment 102 of containment structure 101 when, for instance, on a transport (not shown).

An electronic system, such as a computer, is associated with or integrated with containment structure 101 and can include various types of user interface mechanisms including, for instance, an external display 110, and one or more user actable inputs 112 such as, for instance, a power button. As illustrated in FIG. 1B, portable electronic device 120 to be secured within internal compartment 102 of containment structure 101 is operatively coupled to the electronic system via a connection, such as a wired connection 122, or if desired, a wireless connection. Further, as shown in FIGS. 1A & 1B, internal compartment 102 of containment structure 101 can be sized to accommodate multiple electronic devices, any one or more of which may be operatively coupled to the electronic system associated with the containment structure, as desired for continued use within the containment structure as described herein. As shown in FIG. 1C, after being operatively connected to the electronic system of electronic device containment system 100, electronic device 120 is sealed within the internal compartment by closing and locking door 104. For instance, the door can be electronically locked via the electronic system activating electronic locks 105 based on detecting one or more specified conditions, such as discussed herein.

Figure 2:
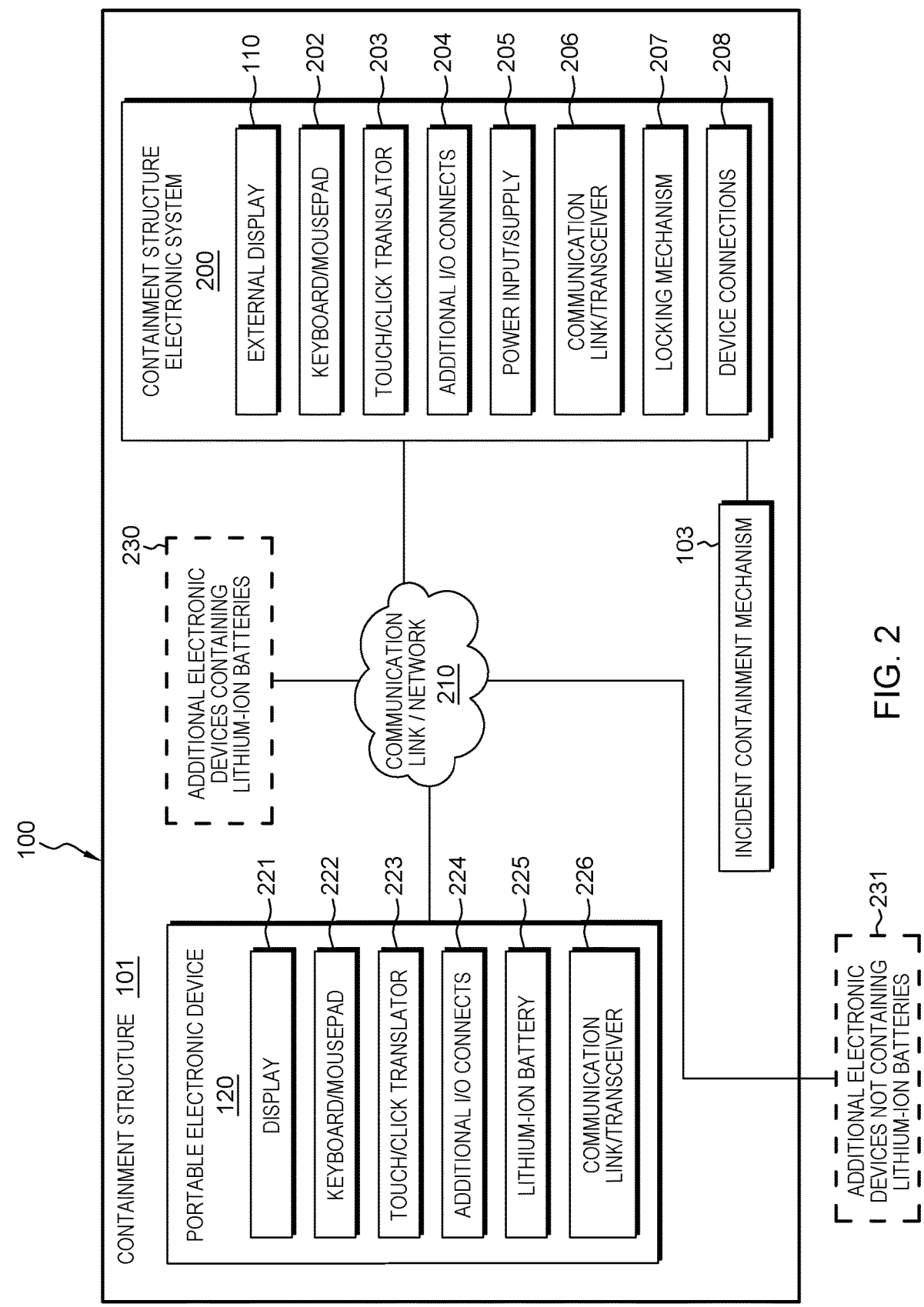
FIG. 2 is a schematic of one embodiment of an electronic device containment system and one or more electronic devices operatively secured within the containment system, in accordance with one or more aspects of the present invention.

FIG. 2 is a schematic of one embodiment of electronic device containment system 100 which includes containment structure 101, an electronic system 200 associated with containment structure 101, and one or more incident containment mechanisms 103. A communication link/network 210 is provided to operatively couple one or more electronic devices 120, 230 and 231 to electronic system 200. Additional electronic devices can include additional electronic devices containing lithium-ion batteries 230, or other batteries susceptible to failure events, as well as additional electronic devices not containing lithium-ion batteries 231, which can be operatively connected to the containment system, but remain outside the containment system. Thus, as noted, in one or more embodiments, containment structure 101 can be sized to accommodate a number of portable electronic devices possessed by a user, and for which it may be desirable for the user to continue to operate while contained, such as while on a transport. The communication link/network 210 can be configured, for instance, with one or more types of connection links, such as, for instance, USB, HDMI, etc., or other links, to allow a user to operatively connect different devices to electronic system 200 and thereby remotely (or indirectly) operate or control the electronic devices 120, 230, 231, via electronic system 200. Note that a communications network or link can be any medium used to provide communication links between various devices and computers connected together within a processing environment. For instance, communication link/network 210 can include a variety of connections such as wires, wireless communication links, fiber optic cables, etc. In one or more embodiments, electronic system 200 includes an interface to allow a user to select a particular electronic device, of multiple operatively connected devices, to remotely control via the electronic system. For instance, an actual or virtual button, switch, icon, etc., could be provided to allow a user to select which connected electronic device the user wishes to control at a given time.

In the embodiment of FIG. 2, electronic system 200 includes a number of components including, for instance, external display 110, a keyboard and/or mousepad 202, a touch/click translator or translation application 203 (such as described herein) as well as additional I/O inputs 204 and a power input/supply 205. Further, a communication link and/or transceiver 206 and device connections 208 allow electronic system 200 to communicate with, for instance, electronic devices 120, 230 housed within containment structure 101, as well as, if desired, one or more communication links or networks for communicating with other devices 231 and/or other systems, such as a remote or backend cloud server for offloading one or more aspects of processing described herein. Any processing or supplemental processing at, for instance, a backend or cloud server could be implemented by any of a variety of computer systems, such as those described below with reference to FIGS. 7-9. Note also that the illustrative aspects described herein can be applied to any of a variety of computing environments.

As shown in FIG. 2, electronic system 200 can also include a locking mechanism 207 to control locking of the containment system. For instance, locking mechanism 207 can implement or include, in one or more embodiments, a control process for controlling electronic locks 105 (see FIGS. 1A-1C), for instance as described below with reference to FIGS. 4 & 5.

In the embodiment shown, electronic device 120 includes a display 221, a keyboard/mouse pad 222, touch/click translation processing 223, such as described herein, additional input/outputs, a power supply, such as a lithium-ion battery 225, and a communication link/transceiver 226 to facilitate communicating via communication link/network 210 with electronic system 200. As noted, and by way of example only, in one or more implementations, electronic device 120 can be, for instance, a mobile phone, a personal digital assistant (PDA), a wireless computer, a laptop computer, a tablet, a game device, a camera, etc. Where communication link/network 210 operatively coupling electronic device 120 and electronic system 200 is wireless, the communication can be via, for instance, via a Code Division Multiple Access (CDMA) system, a Global System for Mobile Communication (GSM), a Wideband CDMA (W-CDMA) system, a Long-Term Evolution (LTE) system, an LTE Advanced system, etc.

By way of further explanation, the electronic device(s) 120, 230 can each include various processing, interfaces and memory units such as for example, a modem processor, a reduced instruction set computer/digital signal processor (RISC/DSP), a controller/processor, an internal memory, a generalized audio encoder, a generalized audio decoder, a graphics/display processor and/or an external bus interface (EBI). The modem processor can perform processing for data transmission and reception, for example, encoding, modulation, demodulation, and decoding. The RISC/DSP can perform general and specialized processing for the device. In one or more embodiments, the controller/processor can control the operation of various processing and interface units within the device. The internal memory stores data and/or instructions for various units within the device.

A generalized audio encoder performs encoding for input signals from an audio source, a microphone, etc. A generalized audio decoder performs decoding for coded audio data and provides output signals to, for instance, a speaker/headset. The graphics/display processor performs processing for graphics, videos, images and text, which are presented to a display unit. The EBI facilitates the transfer of data to and from processing and main memory. The device can be implemented with one or more processors, DSPs, microprocessors, RISCs, etc. The device can also be fabricated on, or utilize, one or more application-specific integrated circuits (ASICs), and/or other types of integrated circuits (ICs).

In one or more implementations, any such electronic device has memory for storing instructions and data, as well as hardware, software, and firmware, and/or combinations thereof, which can be used, for instance, to implement one or more aspects of the processing described herein.

The touch/click translation described below with reference to FIG. 3 can be implemented by one skilled in the art in various ways. For instance, the touch/click translation can occur at a touch/click translator 203 associated with electronics system 200, or at a touch/click translator application 223 associated with electronic device 120, or both working together. For example, in operation touch/click translator 223 of electronic device 120 can be used to receive input resulting from user interaction with electronics system 200 associated with containment structure 101, and facilitate converting that data to event actions on the electronic device itself. Alternatively, or additionally, one or more aspects of translation or scaling can occur remotely, such as at a backend or cloud server accessible by electronic system 200.

Those skilled in the art will note from the description provided herein that external display 110 can be a touch screen-type display, or not. Further, I/O connects or ports 204, for instance, on the exterior of containment structure 101 can allow a user to interface with one or more devices inside of the containment structure through electronic system 200. In operation, user input, such as touch/click locations on exterior display 110 of containment system 100, are translated to touch/click events at the correct XY locations on the internal electronic device 110, and optionally, pressure applied could also be monitored and translated, if desired.

Advantageously, containment structure 101 is configured to contain and suppress a battery-related event or incident, such as, for instance, an explosion, fire, emitted gasses, etc., resulting from a lithium-ion battery-related event, while electronic system 200 associated with containment structure 101 allows the user to safely use their device, such as onboard a transport, while the device is secured within the containment structure and functioning normally. Note that although discussed herein with reference to lithium-ion batteries, the electronic device containment system can be configured to contain any electronic device with any type of power source, such as devices using NiMH batteries, fuel cells or any other battery type, voltage storage unit, current storage device, etc.

In one or more embodiments, containment structure 101 can house a user's electronic device(s) while the user is on a transport, to contain any potential lithium-ion battery related incident with the electronic device(s). In one or more implementations, separate containment structures can be provided for each type of portable electronic device. For instance, a containment structure for a touch screen mobile phone can include a touch screen external display, but no keyboard or mouse pad, whereas a containment structure for a laptop computer could contain an external keyboard and mouse pad, and the external display need not be or have touch screen capabilities. Further, the electronic system can contain a power input such that the system components receive power from an external source (e.g., an outlet on a transport), or the containment system itself could receive power from an internal power source, such as an internal battery (e.g., an internal lithium-ion battery), or even utilize power from the housed electronic device(s) within the internal compartment of the containment structure. As noted, additional electronic devices (e.g., camera, external hard drive, etc.) that contain (for instance) a lithium-ion battery could also be connected to the containment system and housed in the containment structure. Additional devices 231 that do not contain, for instance, a lithium-ion battery (e.g., flash drive, wired headphones, USB keyboard, etc.) could remain outside the containment structure, and connect to the electronic system via external ports.

Figure 3:
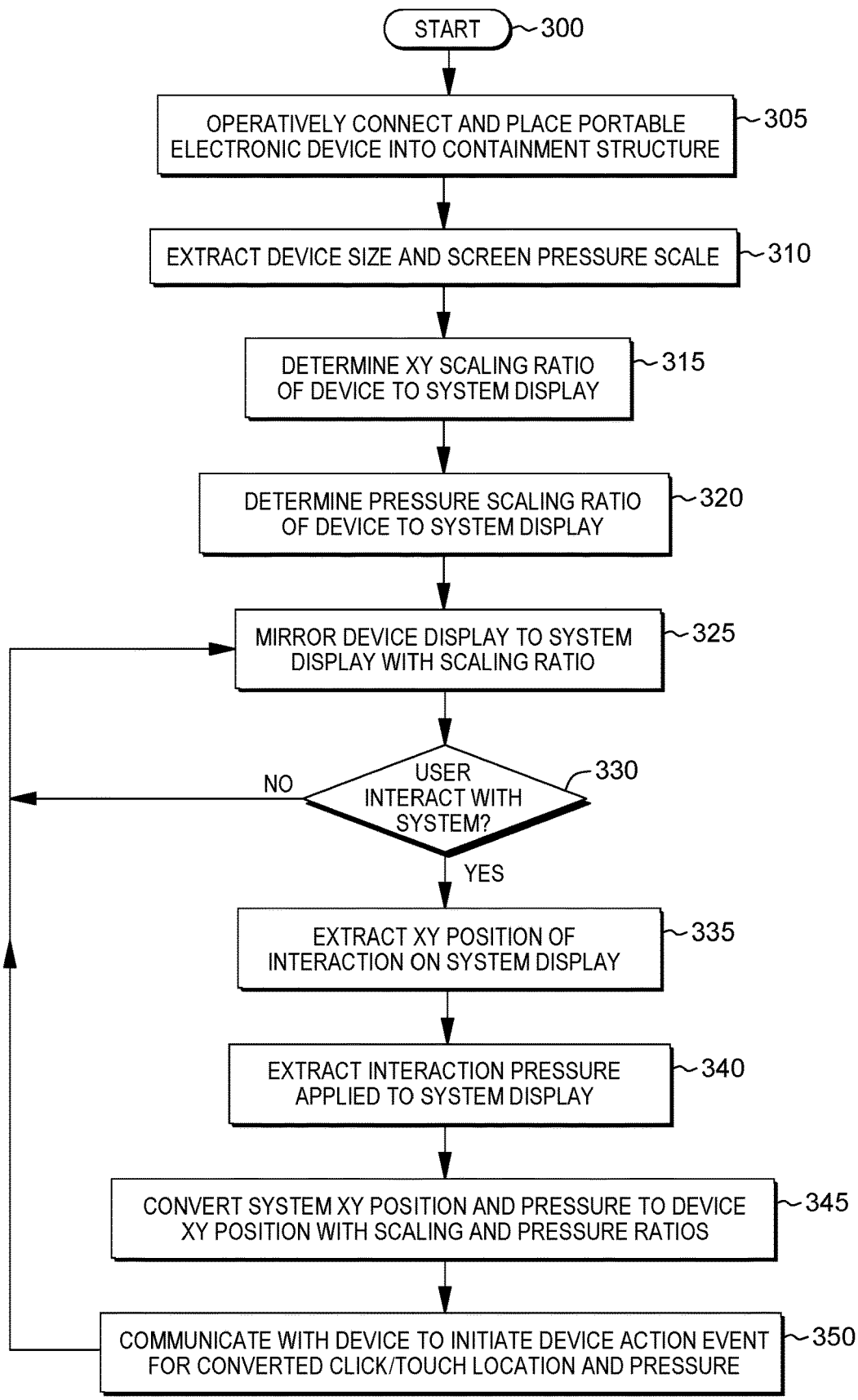
FIG. 3 depicts one embodiment of a process for translating and communicating user input via the electronic system associated with the containment structure to corresponding electronic device input when the device is operatively coupled to the electronic system, in accordance with one or more aspects of the present invention.

FIG. 3 depicts one embodiment of a process for translating and communicating user input via the containment system to a portable electronic device positioned within the containment system. Processing starts 300 with a user or operator operatively connecting and placing an electronic device into the containment structure 305. The device size and screen pressure scale can be extracted or inputted 310. For instance, a user could input their device type to extract the display size and pressure sensitivity (that is, assuming that the device has a pressure sensing screen). Alternatively, a user could manually enter the required device specifications. An XY scaling ratio of the device to the system display is determined 315. For instance, assuming that a device display is 1334×750 pixels, and the system display is 2668×1500 pixels, then the XY scaling ratio would be 1:2. A pressure scaling ratio of the device display to the system display can be determined 320. For example, if a device pressure scale can read between 0 and 3 newtons and the system display can read between 0 and 5 newtons, then the pressure scaling ratio would be 3:5. With this information, the device display can be mirrored to the system display with the scaling factor using a wired or wireless connection (e.g., using an internal HDMI cable, Wi-Fi, etc., as described herein) 325.

The electronic system determines whether a user has interacted with the system display 330. If "no", then processing waits for the user to interact with the system display. Interacting with the system display could be the user touching the touch screen, moving a mouse location via a mouse pad, or providing input from a keyboard, etc. Once the user interacts with the electronic system, the XY position of any touch/click location of the interaction 335, as well as any applied pressure can be extracted 340. The system XY position and pressure are then converted to a device display XY position and pressure with the ascertained scaling and pressure ratios 345. The system communicates with the device to initiate a device action event for the converted click/touch location and pressure signal 350, and then loops back to continue to mirror the internal electronic device display to the system display 325.

Figure 4:
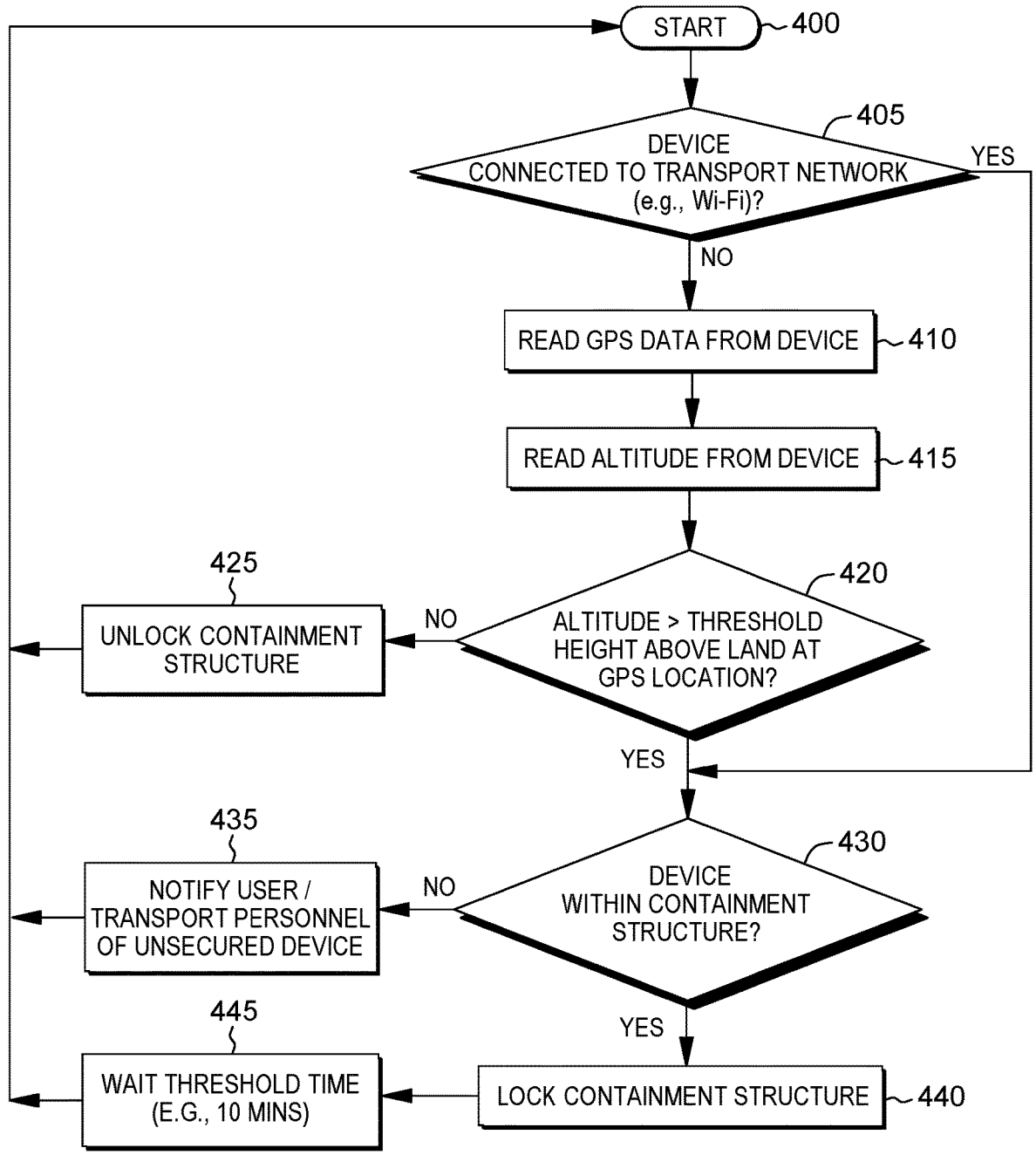
FIG. 4 depicts one embodiment of a process for securing an electronic device within an electronic device containment system, in accordance with one or more aspects of the present invention.

FIG. 4 depicts one embodiment of a process for securing an electronic device within an electronic device containment system, in accordance with one or more aspects of the present invention. This process represents one embodiment only for securing one or more electronic devices within an electronic device containment system such as described herein. The process starts 400 with processing determining whether an electronic device is connected to a transport's network (such as, for instance, a Wi-Fi network associated with a transport) 405. If "no", then the process can read global positioning system data from the electronic device 410, as well as an altitude from the electronic device 415 (in the case where the transport is an airplane). If the altitude is less than a threshold height above land at a particular GPS location 420, then the containment structure can be or remain unlocked 425. In the embodiment depicted, if the altitude is greater than the threshold height above land at the particular GPS location, or if the electronic device is connected to the transport's network, then the process can determine if the electronic device is within the containment structure 430. For instance, sensors, such as weight sensors, capacitor sensors, proximity sensors, etc., could be employed to determine if an electronic device is within the containment structure. If "no", then the user and/or transport personnel could be notified of an unsecure electronic device 435. If the electronic device is within the containment structure, then the containment structure can be locked 440, such as electronically locked, as described herein. Processing can wait a threshold amount of time (e.g., 10 minutes) 445, before looping back to the start 400 to repeat the process. Note that the threshold waiting time can be selected such that the containment structure remains locked during, for instance, a transport landing. The threshold waiting time also helps to minimize battery usage where the processing depicted runs on battery power. Other methods of detecting whether to lock the containment structure could also be used. For instance, a proximity of the electronic device or electronic device containment system to a control or controller on the transport could be used, such as a proximity device or control system that a user could cross or pass by when boarding a transport (for instance, RFID detection could be used when passing through a transport doorway).

Figure 5:
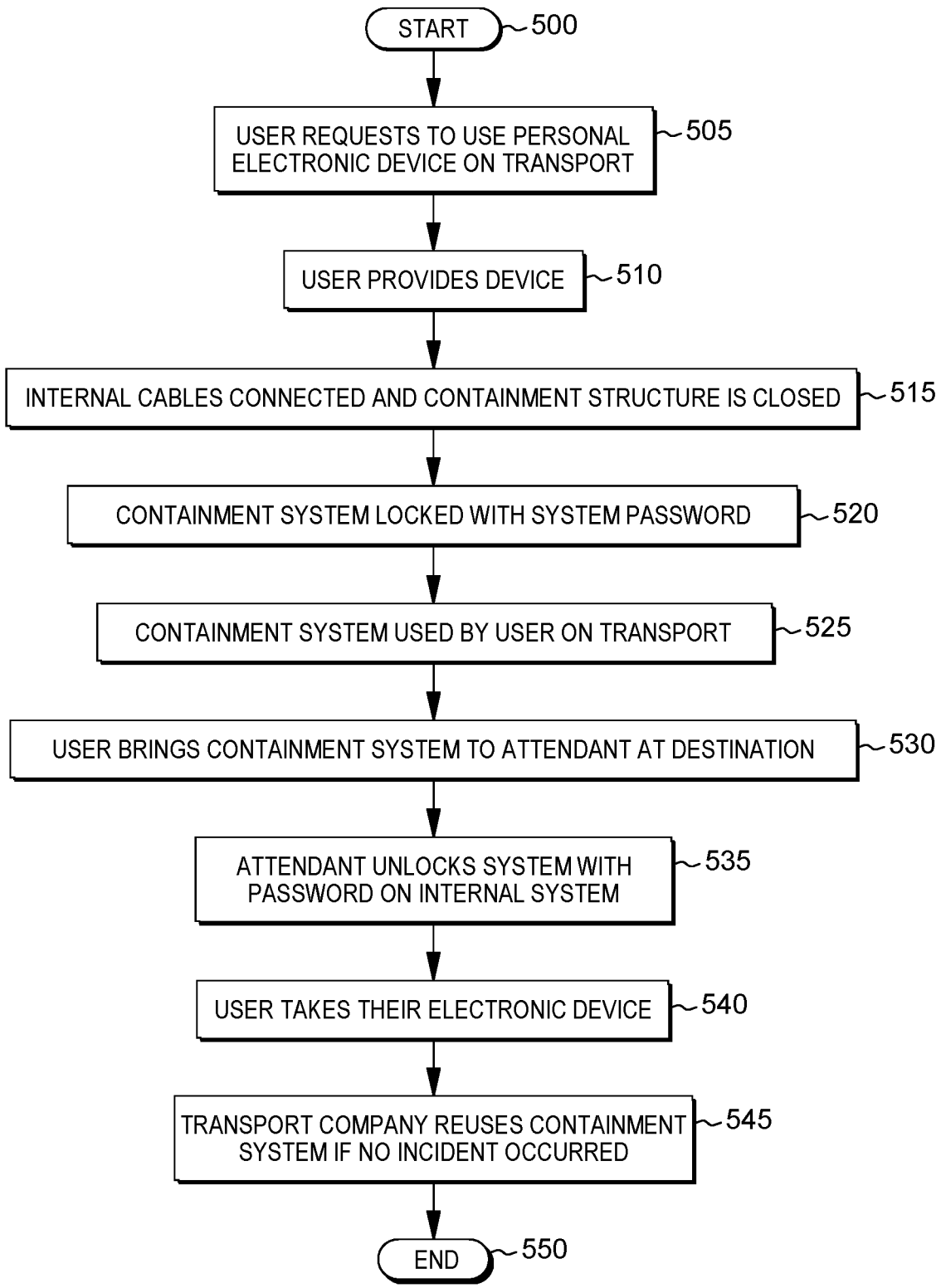
FIG. 5 depicts one embodiment of a process of using an electronic device containment system, in accordance with one or more aspects of the present invention.

FIG. 5 depicts one embodiment of a process for using an electronic device containment system, in accordance with one or more aspects. This process could be used as an alternative process to that described above in connection with FIG. 4. Referring to FIG. 5, processing starts 500 with a user requesting to use a personal electronic device on a transport 505. The user provides their electronic device 510 for securing within the containment structure, and in one or more embodiments, one or more internal cables may be connected between the electronic device and the electronic system of the containment structure, before the containment structure is closed 515. The containment structure is locked with, for instance, a system password 520 that may be logged into the transport's internal system. Alternatively, the containment structure could be locked using a key which is provided to transport personnel, and can subsequently be used after arrival at a desired location. Optionally, a key could be a universal key, at least one of which is located at each arrival location, such that the key does not have to be transported with the passengers or users on the transport. As described herein, the electronic device within the electronic device containment system can be used by the user on the transport 525. Upon arrival at the desired destination, the user can bring the containment system to an attendant at that destination 530, and the attendant can unlock the structure with, for instance, the password on the transport's internal system 535. The user can then remove their electronic device 540, and if desired, the transport company can reuse the containment system if no incident occurred 545, which ends the process 550.

Figure 6:
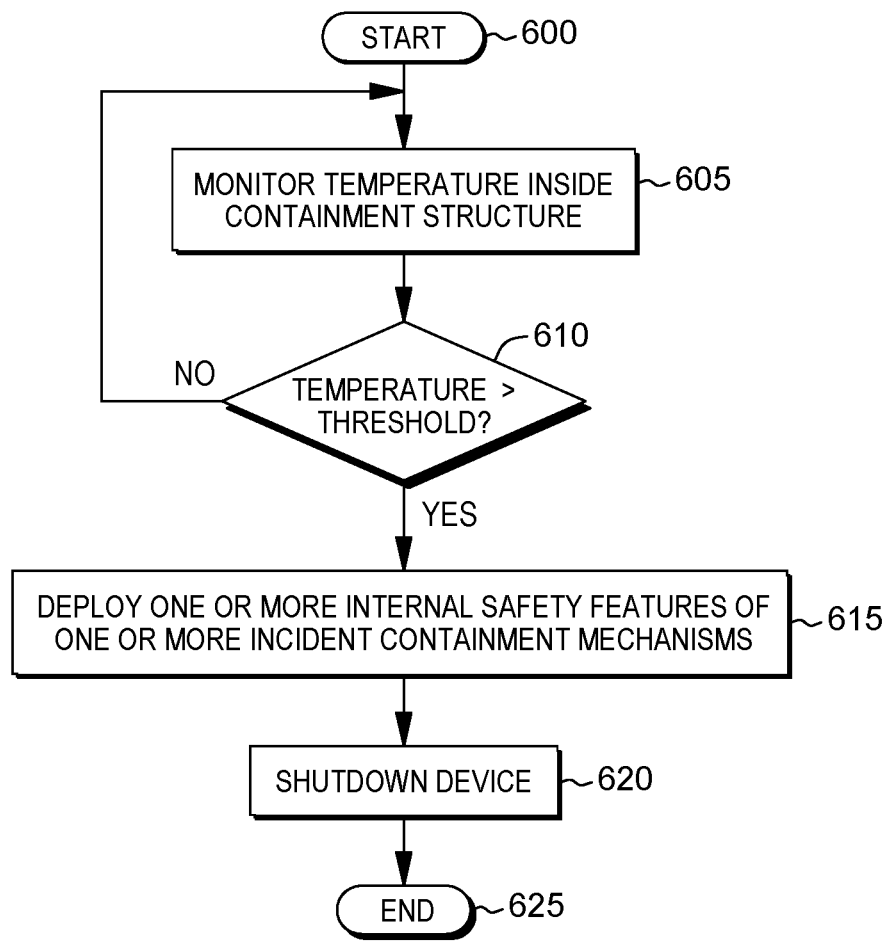
FIG. 6 depicts one embodiment of an incident containment process implemented by an electronic device containment system, in accordance with one or more aspects of the present invention.

FIG. 6 depicts one embodiment of an incident containment process implemented by an electronic device containment system, such as disclosed herein. The process starts 600 by monitoring, for instance, temperature inside the containment structure 605. In one or more embodiments, the temperature monitoring can be continuous within the containment structure. Alternatively, in one or more embodiments, other criteria could be measured, such as omitted gases within the containment structure. Processing determines whether the monitored temperature has exceeded a threshold temperature 610. If "no", then no action is taken other than the continued monitoring. Note that the threshold temperature can be selected to be above a typical temperature that the electronic device would generate within an enclosed structure. If the threshold temperature is exceeded, then one or more internal safety features of one or more incident containment mechanisms 615 can be deployed to contain the incident. The safety features could include, but are not limited to, the release of firefighting foam, heat extraction, full containment of flames, heat, smoke, toxic fumes, and flammable vapors. Further, the containment system can send a signal to the electronic device to have the electronic device initiate an emergency shutdown even to prevent further use of, for instance, a faulty lithium-ion battery powering the electronic device 620. Once suppressed and/or shutdown, processing ends 625.

Exemplary embodiments of computing environments which may implement one or more aspects of the present invention are described below with reference to FIGS. 7-9.

Figure 7:
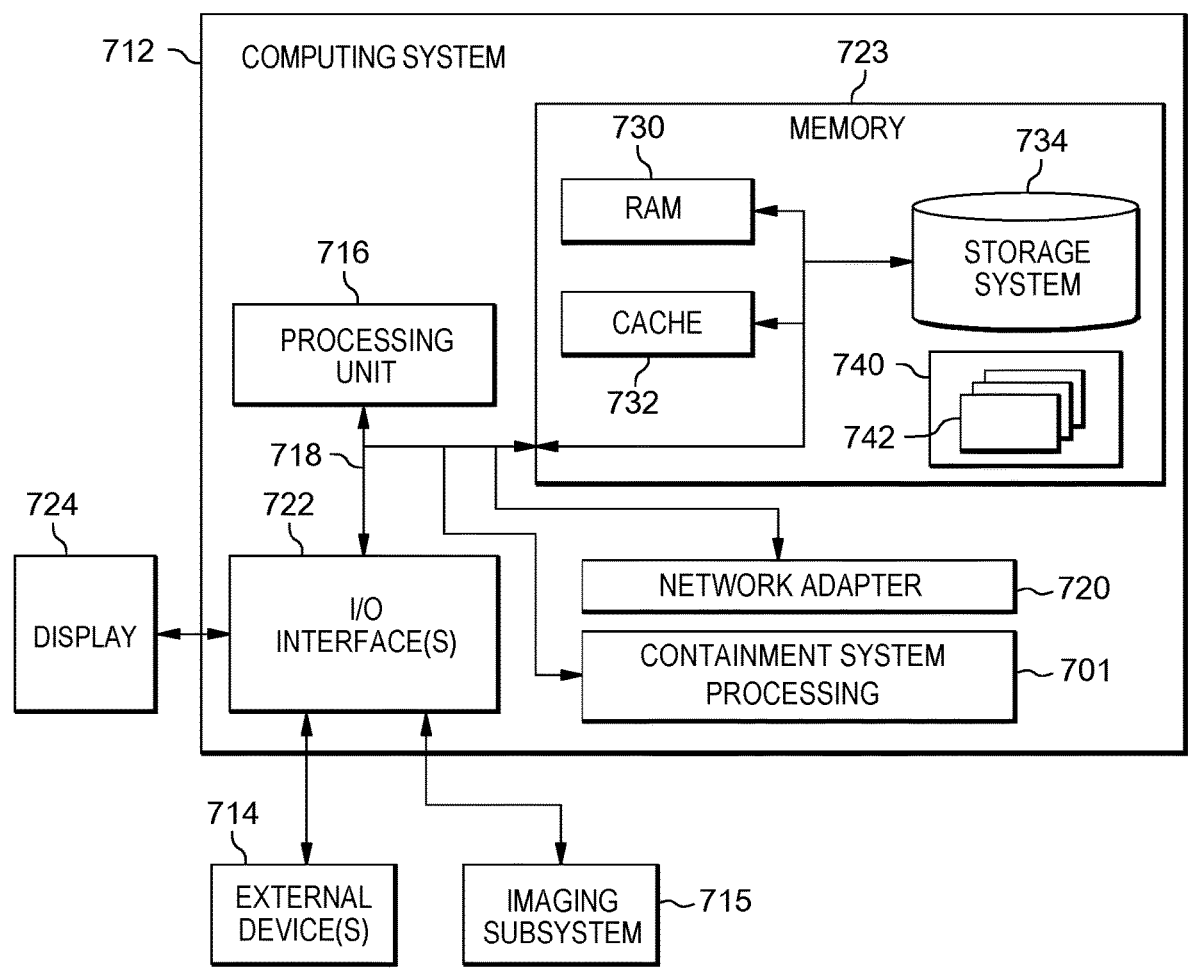
FIG. 7 depicts one embodiment of a computing system which can implement or facilitate implementing one or more aspects of an electronic device containment system, in accordance with one or more aspects of the present invention.

By way of example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 712 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 7, computing system 712, is shown in the form of a general-purpose computing device. The components of computing system 712 may include, but are not limited to, one or more processors or processing units 716, a system memory 723, and a bus 718 that couples various system components including system memory 723 to processing unit 716.

In one embodiment, processing unit 716 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 can include a variety of computer system readable media. Such media can be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 may include at least one program product having a set (e.g., at least one) of program modules that are configured to carry out various functions of embodiments of the invention.

Program/utility 740, having a set (at least one) of program modules 742, may be stored in memory 723 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out various functions and/or methodologies of embodiments of the invention as described herein. Alternatively, or additionally, containment system processing module, logic, etc., 701 can be provided within computing environment 712.

Computing system 712 can also communicate with one or more external devices 714 such as an imaging subsystem 715, a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 7. Computing system 712 of FIG. 7 may be practiced in distributed cloud computing environments where tasks are performed by remote processing devices that are linked through a communications network. In a distributed cloud computing environment, program modules may be located in both local and remote computer system storage media including memory storage devices. Computing system 712 is capable of being implemented and/or performing any of the functionality set forth hereinabove.

Figure 8:
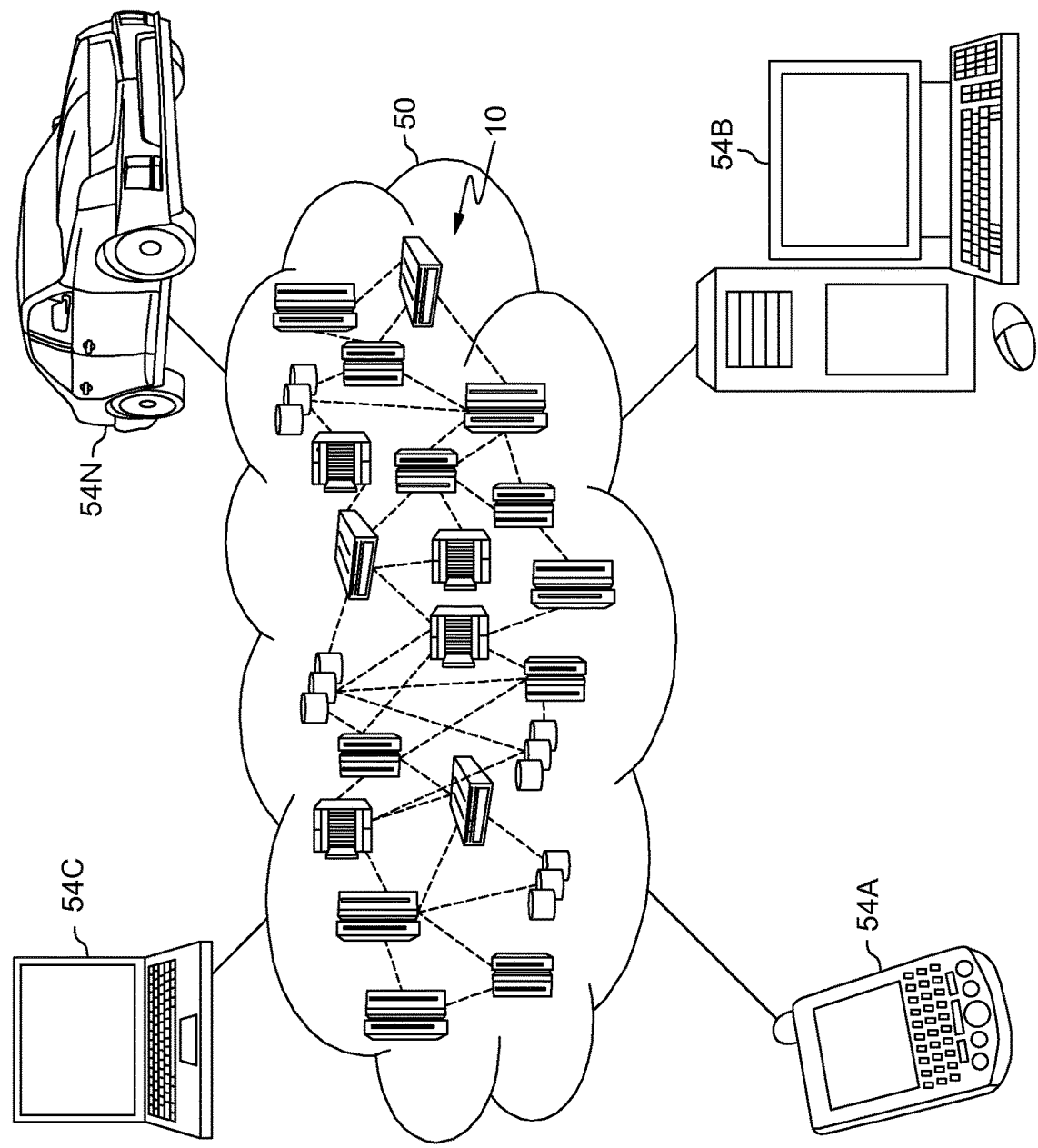
FIG. 8 depicts one embodiment of a cloud computing environment, which may implement, or be used in association with, one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 9:
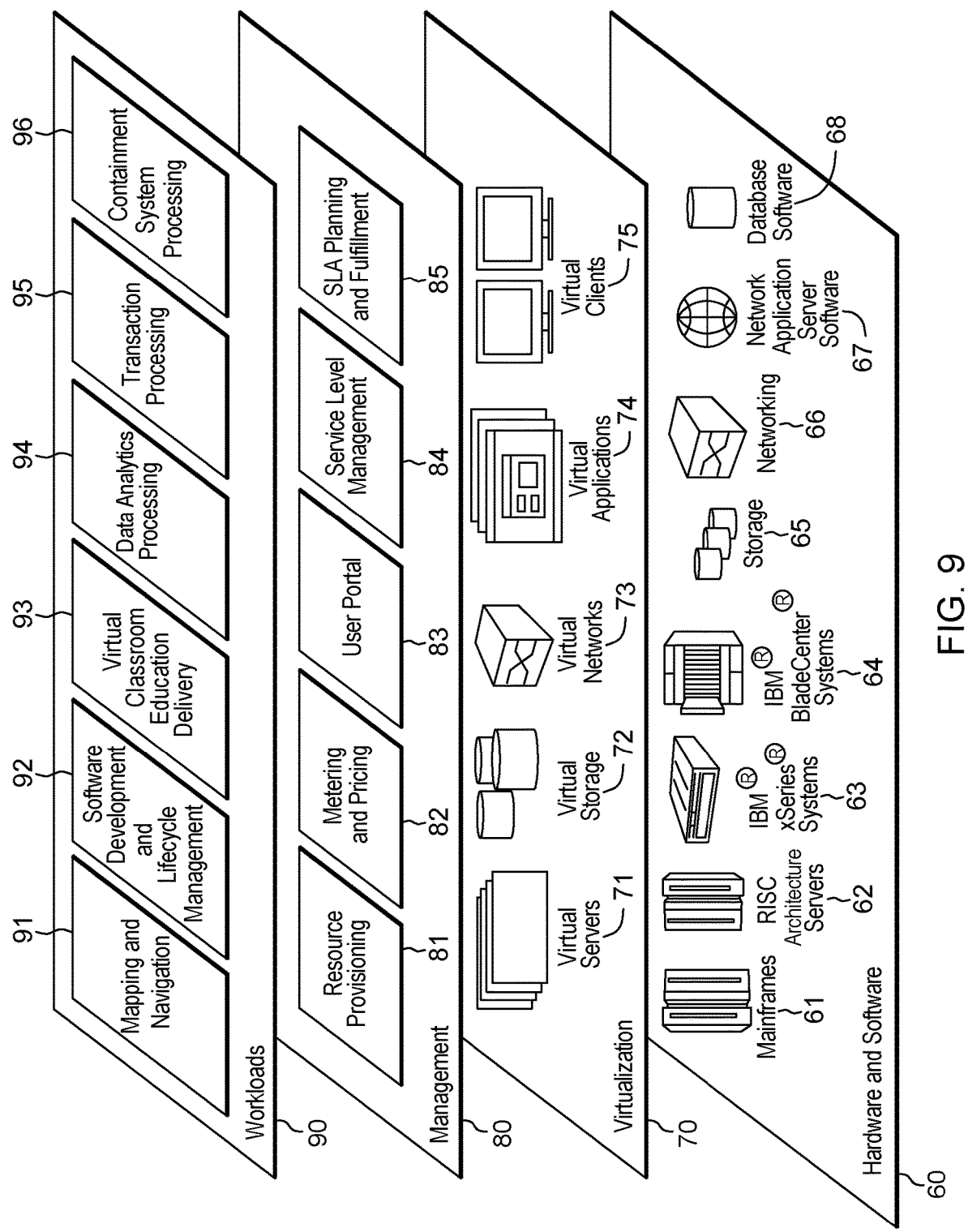
FIG. 9 depicts one example of abstraction model layers, which can facilitate or implement one or more aspects of an electronic device containment system, in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and containment system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An electronic device containment system comprising:
a containment structure with an internal compartment sized to receive an electronic device, the containment structure including an incident containment mechanism to contain a thermal-runaway, battery failure incident of the electronic device within the containment structure when the electronic device is closed within the containment structure, the incident containment mechanism comprising a sensor to identify occurrence of the thermal-runaway, battery failure incident within the containment structure, and based thereon, the incident containment mechanism deploying an internal safety mechanism within the containment structure to mitigate the thermal-runaway, battery failure incident;
an electronic system associated with the containment structure, the electronic device operatively coupling to the electronic system to allow a user to operate the electronic device remotely via the electronic system when positioned within the containment structure;
wherein the electronic system comprises an interface to the electronic device, the interface facilitating user interaction with the electronic device when operatively coupled to the electronic system, the interface of the electronic system comprising an external display screen associated with the containment structure, the external display screen being a touchscreen display; and
wherein at least one of the electronic system and the electronic device includes a translator that facilitates translating user input, including a user interaction location and a user interaction pressure with the external display screen, to corresponding input associated with a device screen of the electronic device when the electronic device is operatively coupled to the electronic system and closed within the containment structure, the device screen of the electronic device being another touchscreen display, wherein the translator:
determines, based on operatively coupling the electronic device to the electronic system, an XY scaling ratio and a pressure scaling ratio, the XY scaling ratio comprising a ratio of the device screen size of the electronic device to the external display screen size associated with the containment structure, and the pressure scaling ratio comprising a ratio of a pressure scale of the device screen of the electronic device to a pressure scale of the external display screen associated with the containment structure;
mirrors the device screen of the electronic device to the external display screen associated with the containment structure using the determined XY scaling ratio and the determined pressure scaling ratio; and
the translator facilitating translating the user input to the external display screen associated with the containment structure to the corresponding input associated with the device screen of the electronic device by converting an XY position and an interaction pressure of the user input to the external display screen associated with the containment structure to a corresponding XY position and pressure signal to the electronic device using the determined XY scaling and pressure ratios.

2. The electronic device containment system of claim 1, further comprising an electronic lock associated with the containment structure, the electronic lock to lock the electronic device within the containment structure, and being controlled by the electronic system based on at least one of a location of the electronic device containment system, an altitude of the electronic device containment system, or a connection of the electronic device to a transport network associated with a transport upon which the electronic device containment system is used.

3. The electronic device containment system of claim 2, wherein the electronic system automatically locks the electronic lock when altitude of the electronic device containment system exceeds a set threshold altitude.

4. The electronic device containment system of claim 2, wherein the electronic system automatically locks the electronic lock based on the electronic device being operatively disposed within the containment structure, and connected to the transport network of the transport.

5. A method of securing an electronic device for transport, the method comprising:
obtaining an electronic device containment system including:
a containment structure with an internal compartment sized to receive the electronic device, the containment structure including an incident containment mechanism;
an electronic system associated with the containment structure, the electronic device operatively coupling to the electronic system to allow a user to operate the electronic device remotely via the electronic system when positioned within the containment structure;
wherein the electronic system comprises an interface to the electronic device, the interface facilitating user interaction with the electronic device when operatively coupled to the electronic system, the interface of the electronic system comprising an external display screen associated with the containment structure, the external display screen being a touchscreen display;
wherein at least one of the electronic system and the electronic device includes a translator that facilitates translating user input, including a user interaction location and user interaction pressure with the external display screen, to corresponding input associated with a device screen of the electronic device when the electronic device is operatively coupled to the electronic system, the device screen of the electronic device being another touchscreen display, wherein the translator:
determines, based on operatively coupling the electronic device to the electronic system, an XY scaling ratio and a pressure scaling ratio, the XY scaling ratio comprising a ratio of the device screen size of the electronic device to the external display screen size associated with the containment structure, and the pressure scaling ratio comprising a ratio of a pressure scale of the device screen of the electronic device to a pressure scale of the external display screen associated with the containment structure;
mirrors the device screen of the electronic device to the external display screen associated with the containment structure using the determined XY scaling ratio and the determined pressure scaling ratio; and
the translator facilitating translating the user input to the external display screen associated with the containment structure to the corresponding input associated with the device screen of the electronic device by converting an XY position and an interaction pressure of the user input to the external display screen associated with the containment structure to a corresponding XY position and pressure signal to the electronic device using the determined XY scaling and pressure ratios;

placing the electronic device within the internal compartment of the containment structure and operatively connecting the electronic device to the electronic system to allow remote operation of the electronic device via the electronic system; and locking the electronic device within the internal compartment of the containment structure, wherein the incident containment mechanism contains a thermal-runaway, battery failure incident of the electronic device within the containment structure, wherein the incident containment mechanism further comprises a sensor to identify occurrence of the thermal-runaway, battery failure incident within the containment structure, and based thereon, the incident containment mechanism deploying an internal safety mechanism within the containment structure to mitigate the thermal-runaway, battery failure incident.

6. The method of claim 5, wherein the electronic device containment system includes an electronic lock associated with the containment structure, the electronic lock to lock the electronic device within the containment structure, and being controlled by the electronic system based on at least one of a location of the electronic device containment system, an altitude of the electronic device containment system, or a connection of the electronic device to a transport network associated with a transport upon which the electronic device containment system is used.

7. The method of claim 6, wherein the electronic system automatically locks the electronic lock when altitude of the electronic device containment system exceeds a set threshold altitude.

8. The method of claim 6, wherein the electronic system automatically locks the electronic lock based on the electronic device being operatively disposed within the containment structure, and connected to the transport network of the transport.

9. A method comprising:
fabricating an electronic device containment system, the fabricating comprising:
providing a containment structure with an internal compartment sized to receive an electronic device, the containment structure including an incident containment mechanism to contain a thermal-runaway, battery failure incident of the electronic device when the electronic device is closed within the containment structure, the incident containment mechanism comprising a sensor to identify occurrence of the thermal-runaway, battery failure incident within the containment structure, and based thereon, the incident containment mechanism deploying an internal safety mechanism within the containment structure to mitigate the thermal-runaway, battery failure incident;
associating an electronic system with the containment structure, the electronic device operatively coupling to the electronic system to allow a user to operate the electronic device remotely via the electronic system when positioned within the containment structure;

wherein the electronic system comprises an interface to the electronic device, the interface facilitating user interaction with the electronic device when operatively coupled to the electronic system, the interface of the electronic system comprising an external display screen associated with the containment structure, the external display screen being a touchscreen display; and wherein at least one of the electronic system and the electronic device includes a translator that facilitates translating user input, including a user interaction location and user interaction pressure with the external display screen, to corresponding input associated with a device screen of the electronic device when the electronic device is operatively coupled to the electronic system and closed within the containment structure, the device screen of the electronic device being another touchscreen display, wherein the translator:
determines, based on operatively coupling the electronic device to the electronic system, an XY scaling ratio and a pressure scaling ratio, the XY scaling ratio comprising a ratio of the device screen size of the electronic device to the external display screen size associated with the containment structure, and the pressure scaling ratio comprising a ratio of a pressure scale of the device screen of the electronic device to a pressure scale of the external display screen associated with the containment structure;
mirrors the device screen of the electronic device to the external display screen associated with the containment structure using the determined XY scaling ratio and the determined pressure scaling ratio; and
the translator facilitating translating the user input to the external display screen associated with the containment structure to the corresponding input associated with the device screen of the electronic device by converting an XY position and an interaction pressure of the user input to the external display screen associated with the containment structure to a corresponding XY position and pressure signal to the electronic device using the determined XY scaling and pressure ratios.

10. The method of claim 9, further comprising associating an electronic lock with the containment structure, the electronic lock to lock the electronic device within the containment structure, and being controlled by the electronic system based on at least one of a location of the electronic device containment system, an altitude of the electronic device containment system, or a connection of the electronic device to a transport network associated with a transport upon which the electronic device containment system is used.

* * * * *